INVENTOR
William L. McGrath
BY Clinton S. Janes
ATTORNEY

Aug. 22, 1933.  W. L. McGRATH  1,923,991
ENGINE STARTER
Filed Dec. 31, 1930   2 Sheets-Sheet 2

INVENTOR
William L. McGrath
BY Clinton S. Janes
ATTORNEY

Patented Aug. 22, 1933

1,923,991

UNITED STATES PATENT OFFICE 1,923,991

ENGINE STARTER

William L. McGrath, Elmira, N. Y., assignor to Eclipse Machine Company, Elmira, N. Y., a Corporation of New York Application December 31, 1930
Serial No. 505,754

7 Claims. (Cl. 74—7)

This invention relates to engine starters and more particularly to an automatic shift for starter gearing of the type in which a motor driven pinion is automatically moved into and out of mesh with a gear mounted on a member of the engine to be started.

It is an object of this invention to provide a novel device of the above character which is of improved efficiency and which is simple and economical to construct.

Another object is to provide such a device in which the driving and shifting functions are accomplished by the same elements, which includes provisions whereby axial thrusts on the elements during driving are not transmitted to the mounting means nor to the anchorages of the shifting elements.

A further object is to provide such a device in which the overall dimensions are small.

Another object is the provision of such a device in which the driving and shifting means are yieldable and the driving connection is so arranged as to reduce the tendency for the driving stresses to produce a permanent set in the yielding shifting means.

Another object is to provide such a device in which the driving connection is in the form of a self-tightening friction coupling, the tightening of which increases the effectiveness as well as the pressure of the frictional contact.

Further objects and advantages will be apparent to those skilled in the art from the following description taken in connection with the accompanying drawings in which.

Figure 1:
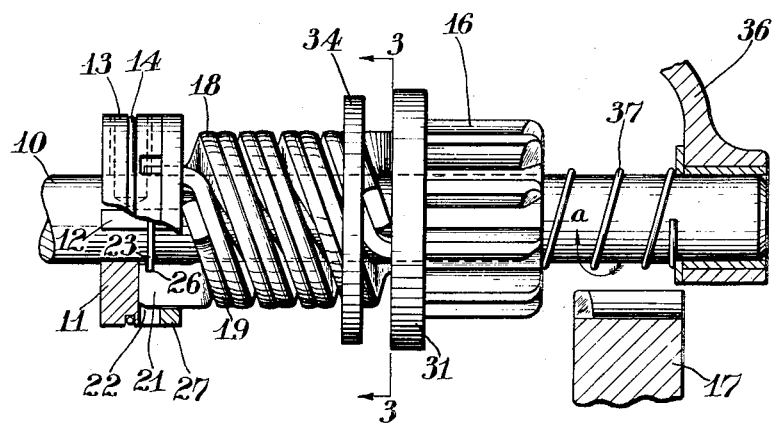
Fig. 1 is a side elevation of the device partly broken away, showing the parts in normal or idle position.
Figure 2:
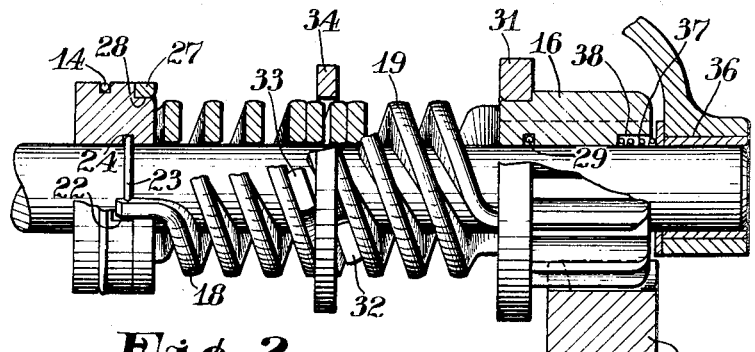
Fig. 2 is a similar view showing the parts in their driving position.
Figure 3:
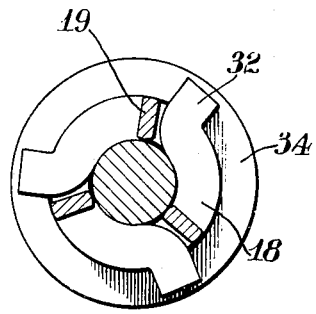
Fig. 3 is a sectional view taken substantially on the line 3—3 of Fig. 1.

In the embodiment of the invention illustrated in Figs. 1, 2 and 3, a power member in the form of a rotary shaft 10 which may be the extended shaft of a starting motor, not shown, is provided with an anchoring means in the form of a collar 11 suitably fixed thereon as by means of a key 12 and pin 13 locked by a spring ring 14.

A driving member in the form of a pinion 16 is freely mounted on the shaft 10 and so arranged that axial movement on said shaft will cause it to engage or disengage a member 17 such as a flywheel gear of the engine to be started. Actuating means for shifting and driving the pinion 16 from the collar 11 are provided in the form of a plurality of spiral spring elements 18, 19 anchored respectively to said collar and pinion. The anchoring means in the collar 11, here illustrated, comprises outturned terminals 21 on said springs adapted to enter axial slots 22 in said collar and retained therein by a spring ring 23 engaging an internal groove 24 in said collar and internal grooves 26 in the ends of said springs. The springs are prevented from radial motion by a retaining ring 27 pressed on a shouldered portion 28 of said collar.

The springs 19 are mounted in a similar manner in the pinion 16, being retained thereon by the spring ring 29 and retaining ring 31.

In order to lock together the extremities of the springs 18 and 19, to complete the driving and positioning connection for the pinion, the free ends of the springs are turned outwardly to form abutments as indicated at 32 and 33 respectively, and a locking thrust collar 34 is mounted loosely on the overlapping portions of said springs between said abutments. The unthreading of said spring members from each other is then prevented by the engagement of the abutments on the opposite sides of the collar.

A bearing 36 for the shaft 10 may be provided adjacent the engine member 17, and anti-drift means such as the light spring 37 adapted to bear against said bearing and the pinion 16, is provided to maintain said pinion normally out of mesh with the engine member. During the driving operation, the spring 37 is preferably housed within a recessed portion 38 in the end of the pinion as illustrated in Fig. 2.

In assembling the device, the springs 18 and 19 are inserted from opposite sides of the locking collar 34 and interthreaded with each other. The retaining ring 31 is then slipped over the free ends of springs 19, the ends of said springs are inserted in the corresponding slots in pinion 16, the ring 29 is sprung into the internal grooves of the springs and pinion, and the retaining ring 31 is then forced in place on the periphery of the pinion to lock the parts in assembled position. The retaining ring 27 is then slipped over the free ends of springs 18, the latter are inserted in the grooves 22 of the collar 11, the spring ring 23 snapped into place, and the retaining ring 27 forced onto the shoulder 28 to lock these parts in assembled position. The pinion and collar assembly may then be slipped upon the driving shaft 10 and the collar 11 fixed thereto by means of the key 12 and pin 13. Spring 37 is then placed in position and the bearing 36 suitably located to procure proper meshing relation between the pinion and engine gear 17.

In operation, acceleration of the driving shaft 10 by the starting motor in the direction of the arrow —a— (Fig. 1) causes the spiral springs 18 to unthread themselves from the springs 19 due to the inertia of the pinion and its associated parts, thus causing longitudinal movement of the pinion to the right in Fig. 1 to mesh the same with the engine gear as illustrated in Fig. 2.

When the pinion has come substantially into proper meshing relation, the abutments 32 and 33 of the springs engage the opposite sides of the collar 34 causing a wedging action to take place as shown in Fig. 2 between the out-turned ends of said springs and the collar member. This wedging action forms a frictional coupling between the overlapping ends of the springs and also increases locally the pitch of the springs whereby the rotary component of the thrust between said overlapping ends is increased, and the effectiveness or torque value of the frictional connection is augmented as the direction of pressure on the frictional surfaces approaches the normal to said surfaces.

When this wedging action has increased sufficiently to transmit the torque of the starting motor to the pinion, cranking takes place through the yielding connection so formed and the engine is started. When the engine becomes self operative, the overrunning of the pinion 16 causes the springs 19 to thread themselves back into the springs 18 as shown in Fig. 1.

It will be noted that during the cranking operation no axial thrusts are transmitted through the springs to the collar and pinion, and the fastening means for the collar and the anchorages of the springs are required to transmit pure rotary motion only.

In case the teeth of the pinion 16 should in the meshing operation engage end to end with the teeth of the engine member 17, the springs 18 and 19 are adapted to yield and allow a time interval for the friction between the convolutions of the springs to build up sufficiently to cause the pinion to be indexed into proper meshing relation with the engine member. The springs 18 and 19 are preferably formed with a rectangular cross section having a large radial dimension compared with its axial dimension in order to allow this yielding to enforce meshing while providing for the necessary torsional stiffness to secure said transmission of power for cranking.

It will be noted that since the ends of the springs 18 and 19 are powerfully wedged together by the collar 34 as described, only a small amount of overlapping between said springs is requisite to transmit the cranking torque. This allows the use of nearly the entire length of said springs to secure the desired resiliency, so that shorter springs may be employed than would otherwise be the case, and a short compact drive is rendered possible.

Figure 4:
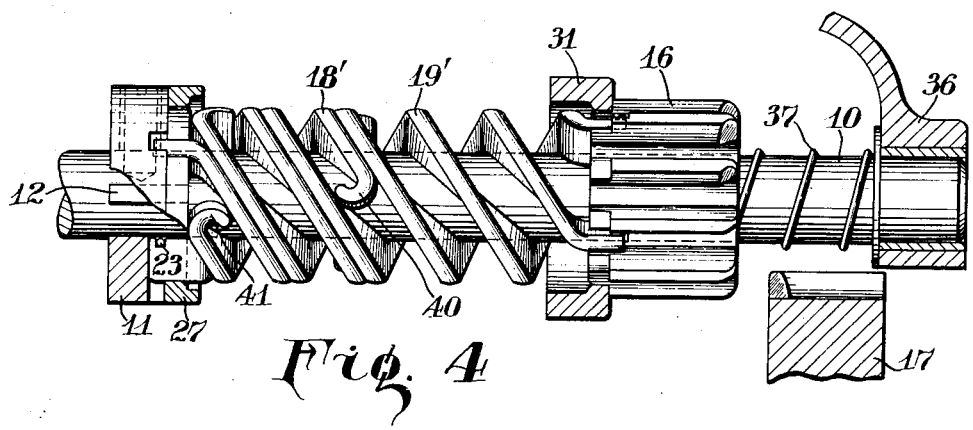
Fig. 4 is a view similar to Fig. 1 showing a modified form of the invention.
Figure 5:
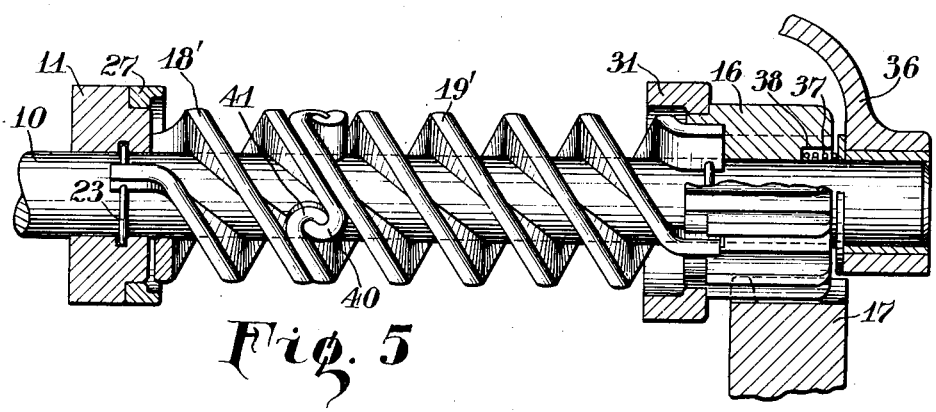
Fig. 5 is a side elevation, partly broken away, of said modified form, with the parts in their driving positions.

In the embodiment of the invention illustrated in Figs. 4 and 5 of the drawings, a positive connection is provided between the ends of the driving and shifting means, instead of the wedging connection above described. The remainder of the structure is similar to that of the first embodiment, the elements thereof being indicated by corresponding numerals.

In order to form the driving connection between the springs 18' and 19' in the structure here shown, interlocking means are provided on the free ends of the springs such as the hooks 40 and 41. These hooks are adapted to engage to limit the unthreading of springs 18' and 19' as shown in Fig. 5, and thereby position and drive the pinion 16, the convolutions of the springs being spaced sufficiently to allow the hooks to slide freely during the threading action. The driving connection so established is a resilient connection in which the yielding effect of substantially the entire length of the springs is utilized. This permits the drive to be made of small dimensions while maintaining the requisite strength and resiliency.

Although certain embodiments of the invention have been illustrated and described in detail, it will be understood that various changes may be made in the construction and proportions of the parts and various other embodiments will be suggested to those skilled in the art without departure from the spirit of the invention as defined in the claims appended hereto.

What is claimed is:

1. An engine starter drive including a power member, a driving member adapted to be moved into and out of engagement with a member of an engine to be started, and means for actuating said driving member from said power member including shifting and rotating means on the driving member, cooperating shifting and rotating means on the power member adapted on acceleration thereof to move the driving member into engagement with the engine member, and means forming a self-tightening friction coupling between said two shifting means for limiting the engine engaging movement of the driving member and for transmitting rotation thereto.

2. An engine starter drive including a power member, a driving member adapted to be moved into and out of engagement with a member of the engine to be started, and means for actuating said driving member from said power member including yielding shifting means on the driving member, cooperating yielding shifting means on the power member adapted upon acceleration thereof to repulse the driving member and move it into engagement with the engine member, and means operative when the driving member is in engagement with said engine member for wedging together the extremities of said two shifting means and increasing the pitch thereof to transmit rotation therethrough to said driving member.

3. An engine starter drive including a power member, a driving member adapted to be moved into and out of engagement with a member of the engine to be started, and means for actuating said driving member from said power member including a yielding spiral member anchored to said power member, a cooperating yielding spiral member anchored to said driving member and interthreaded with said first spiral member, and means causing said interthreaded ends to wedge together to limit the unthreading of said spiral members, said wedging means being arranged to increase the pitch of said spirals.

4. An engine starter drive including a power member, a driving member adapted to be moved into and out of engagement with a member of the engine to be started, and means for actuating said driving member including a spiral member anchored to said power member, a cooperating spiral member anchored to said driving member and interthreaded with said first spiral member, the free ends of said spiral members being formed with radial abutments, and a locking member adapted to engage said abutments and lock the spiral members together.

5. An engine starter drive including a power member, a driving member adapted to be moved into and out of engagement with a member of an engine to be started, and means for actuating said driving member from said power member including spiral members anchored to said power member, cooperating spiral members anchored to said driving member and interthreaded with said first spiral members, the free ends of said spiral members being turned radially outward, and a collar mounted loosely on the overlapping parts of said spirals, adapted to engage said out-turned ends and limit the unthreading action thereof.

6. In an engine starter drive, a rotary shaft, a driving pinion adapted to be shifted into and out of mesh with a gear on the engine to be started, a spring thread anchored at one end to the pinion, a spring thread anchored at one end to the shaft, the free ends of said spring threads being interthreaded whereby relative rotation thereof moves the pinion into and out of mesh with the engine gear, said free ends of the threads being bent outwardly, and a collar mounted loosely on the interthreaded portions of said threads and adapted to be engaged by said out-turned ends to cause the terminal convolutions of the threads to wedge together and transmit rotation.

7. An engine starter drive including a power member, a driving member adapted to be moved into and out of engagement with a member of the engine to be started, and means for actuating said driving member from said power member including yielding shifting means on the driving member, cooperating yielding shifting means on the power member adapted upon acceleration thereof to move the driving member into engagement with the engine member, and means operative when the driving member is in engagement with said engine member for wedging together the extremities of said two shifting means to transmit rotation therethrough to said driving member.

WILLIAM L. McGRATH.